United States Patent
Berry, Jr. et al.

(10) Patent No.: US 9,410,330 B2
(45) Date of Patent: *Aug. 9, 2016

(54) MOBILE SCAFFOLDING UNITS WITH EXTENDIBLE GANTRY PLATFORM AND METHODS OF USING SAME

(71) Applicants: Henry K. Berry, Jr., Williamsburg, VA (US); Henry K. Berry, III, Newport News, VA (US)

(72) Inventors: Henry K. Berry, Jr., Williamsburg, VA (US); Henry K. Berry, III, Newport News, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,478

(22) Filed: Jun. 27, 2014

(65) Prior Publication Data
US 2014/0305737 A1    Oct. 16, 2014

Related U.S. Application Data

(63) Continuation of application No. 13/188,336, filed on Jul. 21, 2011, now Pat. No. 8,800,717, which is a continuation-in-part of application No. 13/037,745, filed on Mar. 1, 2011, now abandoned.

(60) Provisional application No. 61/400,419, filed on Jul. 28, 2010.

(51) Int. Cl.
| | | |
|---|---|---|
| *E04G 1/34* | (2006.01) | |
| *E04G 1/24* | (2006.01) | |
| *B60R 3/00* | (2006.01) | |
| *A01D 46/20* | (2006.01) | |
| *E04G 5/14* | (2006.01) | |

(52) U.S. Cl.
CPC ........ *E04G 1/24* (2013.01); *A01D 46/20* (2013.01); *B60R 3/005* (2013.01); *E04G 5/14* (2013.01); *E04G 1/34* (2013.01)

(58) Field of Classification Search
CPC ............... E04G 2001/158; E04G 2001/242; A01D 46/20
See application file for complete search history.

(56) References Cited

U.S. PATENT DOCUMENTS

| | | |
|---|---|---|
| 1,708,113 A | 4/1929 | Allen |
| 2,196,511 A | 4/1940 | Wagner et al. |
| 2,428,184 A | 9/1947 | Swindler |
| 2,542,497 A | 2/1951 | Fleming, Jr. |
| 2,601,092 A | 6/1952 | Cardiff |
| 2,778,694 A | 1/1957 | Mitchell |
| 2,798,623 A | 7/1957 | Girardi |

(Continued)

OTHER PUBLICATIONS

Prior Art Sketch, Virginia Department of Transportation Device (2010).

*Primary Examiner* — Alvin Chin-Shue
(74) *Attorney, Agent, or Firm* — Nixon & Vanderhye P.C.

(57) ABSTRACT

Mobile scaffolding units include a vehicle for movement across ground surface, a stationary platform rigidly fixed to the vehicle at a predetermined immovable height above the ground surface, and a gantry platform operatively connected to the stationary platform for movements between a retracted position where the gantry platform is nested adjacent to the stationary platform, and an extended position wherein the gantry platform extends laterally outwardly from one or another lateral side of the stationary platform to provide an operator on the gantry platform an extended horizontal reach laterally of the vehicle. The mobile scaffolding units allow an operator to work at elevated heights and with lateral reach in one area of a work zone (e.g., to trim roadside vegetation) and then move to another area of the work zone without requiring an operator to dismount from the gantry platform.

16 Claims, 17 Drawing Sheets

(56) References Cited

U.S. PATENT DOCUMENTS

| | | |
|---|---|---|
| 3,031,027 A | 4/1962 | Mitchell |
| 3,217,449 A | 11/1965 | Levere |
| 3,352,380 A | 11/1967 | Barney |
| 3,529,696 A | 9/1970 | Jacobsen |
| 3,537,546 A | 11/1970 | Klock |
| 3,556,249 A | 1/1971 | Jackson |
| 3,703,220 A | 11/1972 | Williams et al. |
| 4,620,612 A | 11/1986 | Enoki et al. |
| 4,787,111 A | 11/1988 | Pacek et al. |
| 5,067,589 A | 11/1991 | Bartnicki |
| 5,301,770 A | 4/1994 | Regan et al. |
| 6,349,793 B1 | 2/2002 | Kincaid |
| 7,004,286 B2 | 2/2006 | Fredette |
| 8,042,653 B2 | 10/2011 | Grebinoski et al. |
| 8,499,889 B2 | 8/2013 | DuBose et al. |

MOBILE SCAFFOLDING UNITS WITH EXTENDIBLE GANTRY PLATFORM AND METHODS OF USING SAME

CROSS-REFERENCE TO RELATED APPLICATIONS

This application is a continuation of commonly owned U.S. patent application Ser. No. 13/188,336, filed on Jul. 21, 2011 (now U.S. Pat. No. 8,800,717), which is a continuation-in-part (CIP) of U.S. patent application Ser. No. 13/037,745 filed on Mar. 1, 2011 (now abandoned), and claims domestic priority benefits under 35 USC §119(e) from U.S. Provisional Patent Application Ser. No. 61/400,419 filed on Jul. 28, 2010, the entire contents of each such prior filed application being expressly incorporated hereinto by reference.

FIELD

The disclosed embodiments herein relate to mobile devices, specifically motorized vehicles, that are adapted to support and facilitate operator activities including, but not limited to, trimming vegetation adjacent to a roadway.

BACKGROUND

As should be apparent to those skilled in the art, local, state and federal agencies are responsible for trimming roadside flora to keep vegetation from encroaching upon a roadway and, thereby, interfering with passability of the roadway. Presently, when highway workers are tasked with clearing roadside vegetation, they typically rely upon a vehicle with a crane, boom, or similar apparatus so that workers may reach vegetation at specific heights above the road surface.

In one known example, a vehicle with a workman's bucket connected to an extendible arm or boom (colloquially known as a "bucket truck" in art parlance) assists with clearing vegetation above a height that is not otherwise easily accessible from ground level. A disadvantage with this approach lies in the fact that applicable safety guidelines for operation of such vehicles requires that the vehicle be secured before the boom with an operator-occupied bucket may be deployed. Moreover, in order to move the vehicle from one location to another along the roadway, applicable safety regulations require that the operator must dismount physically from the bucket and/or the bucket must be physically secured in a lowered position. In order to secure the vehicle, the vehicle must be stopped so that the wheels can be secured (e.g., by placement of suitable chocks to prevent inadvertent rolling movement). In addition, pontoons are often extended laterally from the body of the vehicle to provide lateral support and prevent tipping while the boom is manipulated by the operator who occupies the bucket.

While this method has proven effective, one significant drawback with it is that the vehicle must be secured periodically at relatively short distance intervals along a roadway to assure that the workers are able to cut the vegetation safely. Moreover, as noted above, the operator must physically dismount from the bucket and/or the bucket must be physically secured in a lowered position before the vehicle is able to move to another location along the roadway. As should be apparent to those skilled in the art, this continual periodic stopping and securing of the vehicle from one location to another along a roadway adds considerably to the time needed to clear vegetation adjacent to the roadway.

A need therefore exists for a mobile unit that would reduce the total time (and hence cost) required for clearing vegetation adjacent to and above a road surface. It is towards fulfilling such need that the present invention is directed.

SUMMARY OF EXEMPLARY EMBODIMENTS

According to some embodiments, mobile scaffolding units are provided which comprise a vehicle for movement across ground surface, a stationary platform rigidly fixed to the vehicle at a predetermined immovable height above the ground surface, and a gantry platform operatively connected to the stationary platform for movements between a retracted position where the gantry platform is nested adjacent to the stationary platform, and an extended position wherein the gantry platform extends laterally outwardly from one or another lateral side of the stationary platform to provide an operator on the gantry platform an extended horizontal reach laterally from the vehicle.

According to some embodiments, the gantry platform is moveable between a first extended position where the gantry platform extends outwardly from one side of the stationary platform and a second extended position where the gantry platform extends outwardly from an opposite side of the stationary platform.

The gantry platform may comprise a gantry guard rail which is removably attached to the gantry platform. According to such an embodiment, the gantry guard rail can be removed when the gantry platform is in the first extended position thereof so as to allow the gantry platform to thereafter be moved from the first extended position to the second extended position thereof. The gantry guard rail can thus be reattached to the gantry platform when in the second position as a mirror image of the gantry guard rail attached to the gantry platform when the gantry platform is in the first extended position thereof.

Some embodiments of the invention will include the gantry platform being operatively connected to the stationary platform so as to be cantilever supported thereby when the gantry platform is in one of the first or second extended positions thereof. As such, weight applied to the gantry platform when in the first or second extended positions applies a bending movement to the rearward portion of the gantry platform thereby frictionally locking the position of the gantry platform against movement toward the retracted position thereof.

A slide rail assembly may be provided in other embodiments of the invention so as to operatively connect the gantry platform for reciprocal rectilinear sliding movements between the retracted and extended positions relative to the stationary platform. The slide rail assembly may comprise a pair of slide rail members rigidly connected to the stationary platform, and a pair of support frame members associated with the gantry platform which are slidably received by the slide rail members. Each of the slide rail members may comprise a bearing member which in certain preferred embodiments is formed of a solid polymeric bearing material.

In use, an operator may be provided with extended lateral reach toward a work zone by providing a mobile scaffolding unit according to embodiments of this invention. The gantry platform of the mobile scaffolding unit may thus be moved from the retracted position to the extended position thereof so the gantry platform extends laterally of the vehicle toward the work zone. The mobile scaffolding unit can thus be positioned adjacent to one area of the work zone to thereby allow the operator to work therein. Extension of the gantry platform may be performed prior to or after positioning of the vehicle relative to the work zone. Once an operator has completed the tasks in one area of the work zone, the mobile scaffolding unit can be repositioned to another area of the work zone without operator dismount from the gantry platform.

These and other aspects of the present invention will become more clear after careful consideration is given to the following detailed description of a presently preferred exemplary embodiment thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

FIGS. 1-4 are various views of one contemplated embodiment of a mobile scaffolding unit 10 according to a presently preferred embodiment of the present invention. In general, the mobile scaffolding unit 10 according to the embodiment depicted in FIGS. 1-4 will be comprised of a scaffolding unit SU that is fixed to and carried by a suitable motorized vehicle MV. In the embodiment depicted, the motorized vehicle MV just happens to be shown in the form of a conventional wheeled truck, however, any other suitable wheel- or track-equipped vehicle that can be directionally controlled by an operator for movement over the roadway RW or other ground surfaces may be employed.

The scaffolding unit SU is generally comprised of a stationary platform 20 which is immovably fixed to the motorized vehicle MV (e.g., the vehicle chassis VC) and a movable gantry platform 50 which is connected to the stationary platform 20 for relative rectilinear slideable movements. As will be described in greater detail below, such slideable movements allow the gantry platform 50 to be extended laterally relative to the stationary platform 20 so it can be extended from one or another side thereof. The cross-vehicle dimension of the gantry platform 50 is also such that it can assume a retracted position subjacently to stationary platform 20. In such a retracted position, the gantry platform 50 will not extend laterally beyond the stationary platform 20 so the mobile scaffolding unit 10 can proceed along the roadway RW unimpeded.

Figure 1:
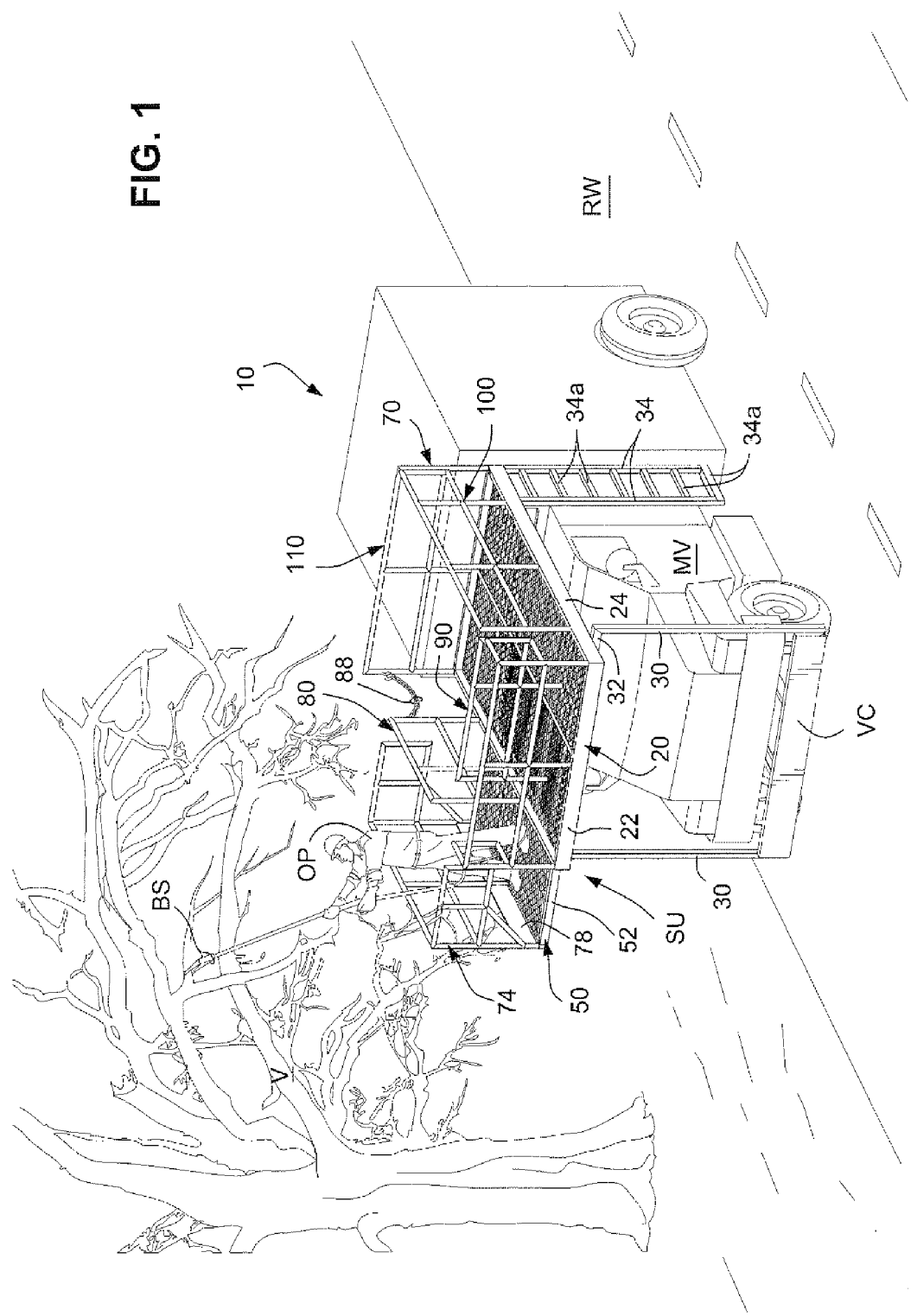
FIG. 1 is a top left front perspective view of a mobile scaffolding unit according to one embodiment of the present invention depicted in an environment of use to assist an operator with trimming of roadside vegetation.
Figure 2:
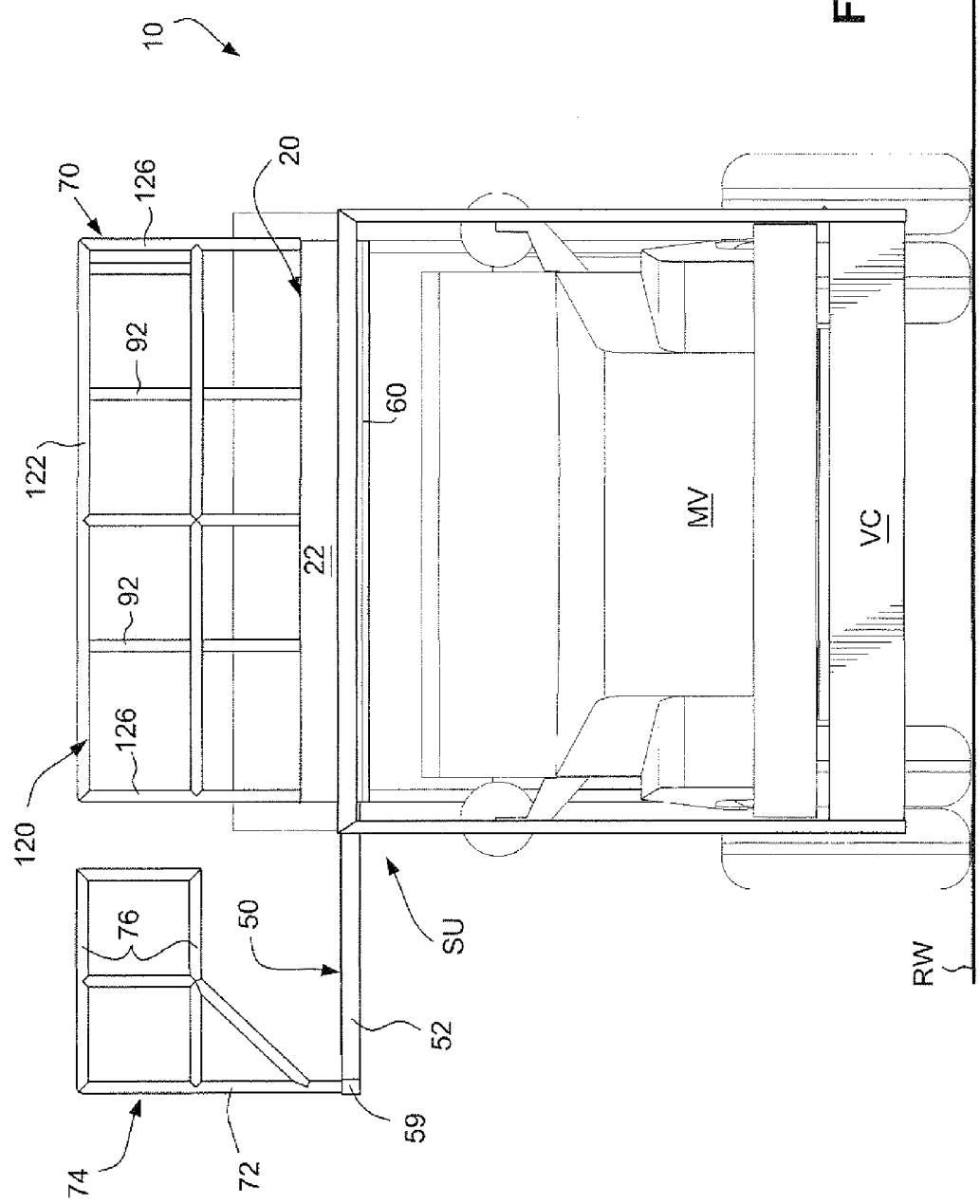
FIG. 2 is a front elevational view of the mobile scaffolding unit.
Figure 3:
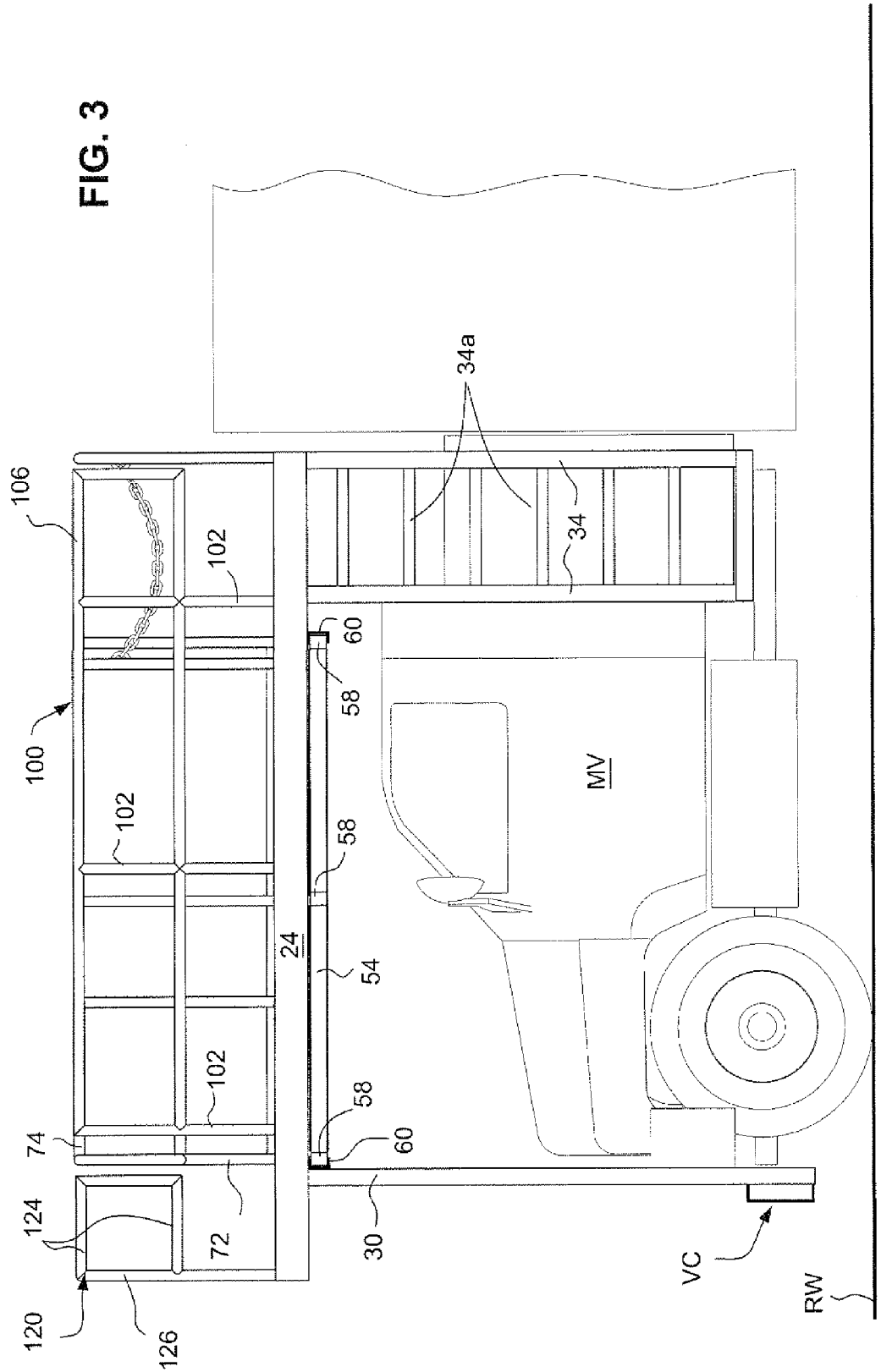
FIG. 3 is a partial left side elevational view of the mobile scaffolding unit.
Figure 4:
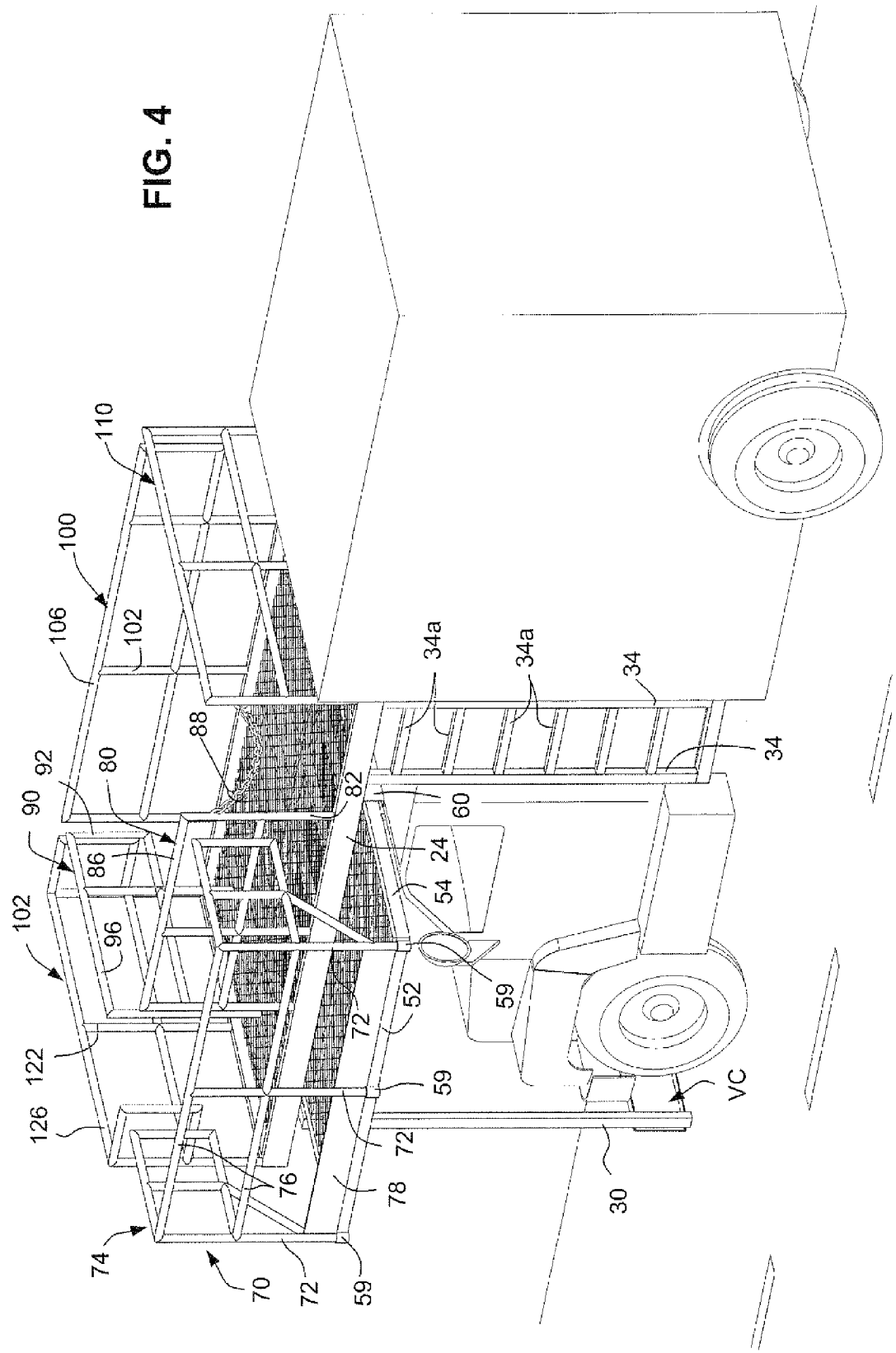
FIG. 4 is a left rear perspective view of the mobile scaffolding unit depicted in FIG. 1 but showing the gantry platform thereof extended from an opposite side of the stationary platform.
Figure 5:
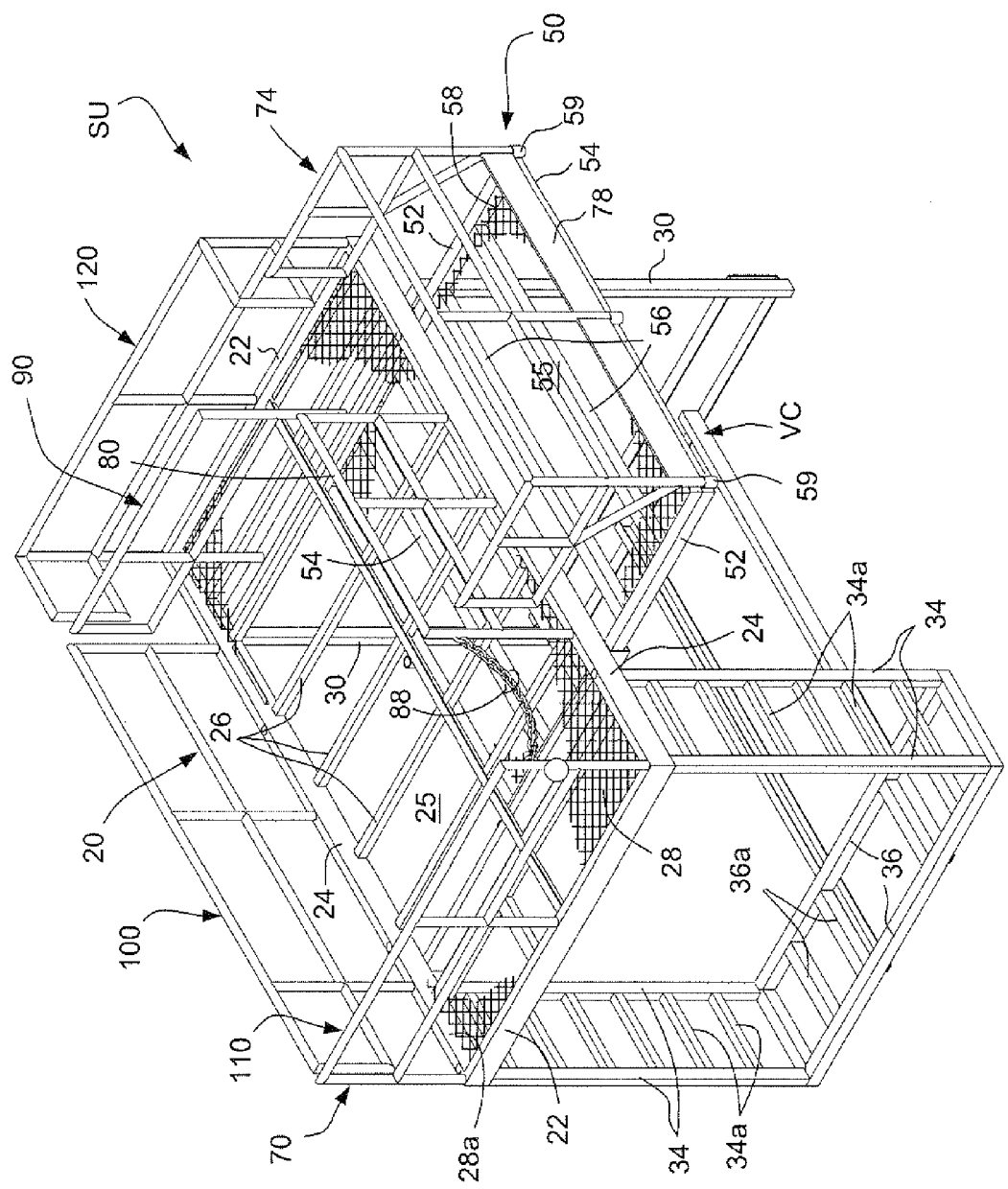
FIG. 5 is a top right perspective view from the rear of the scaffolding assembly disassociated from a vehicle to which it is adapted to be attached.
Figure 6:
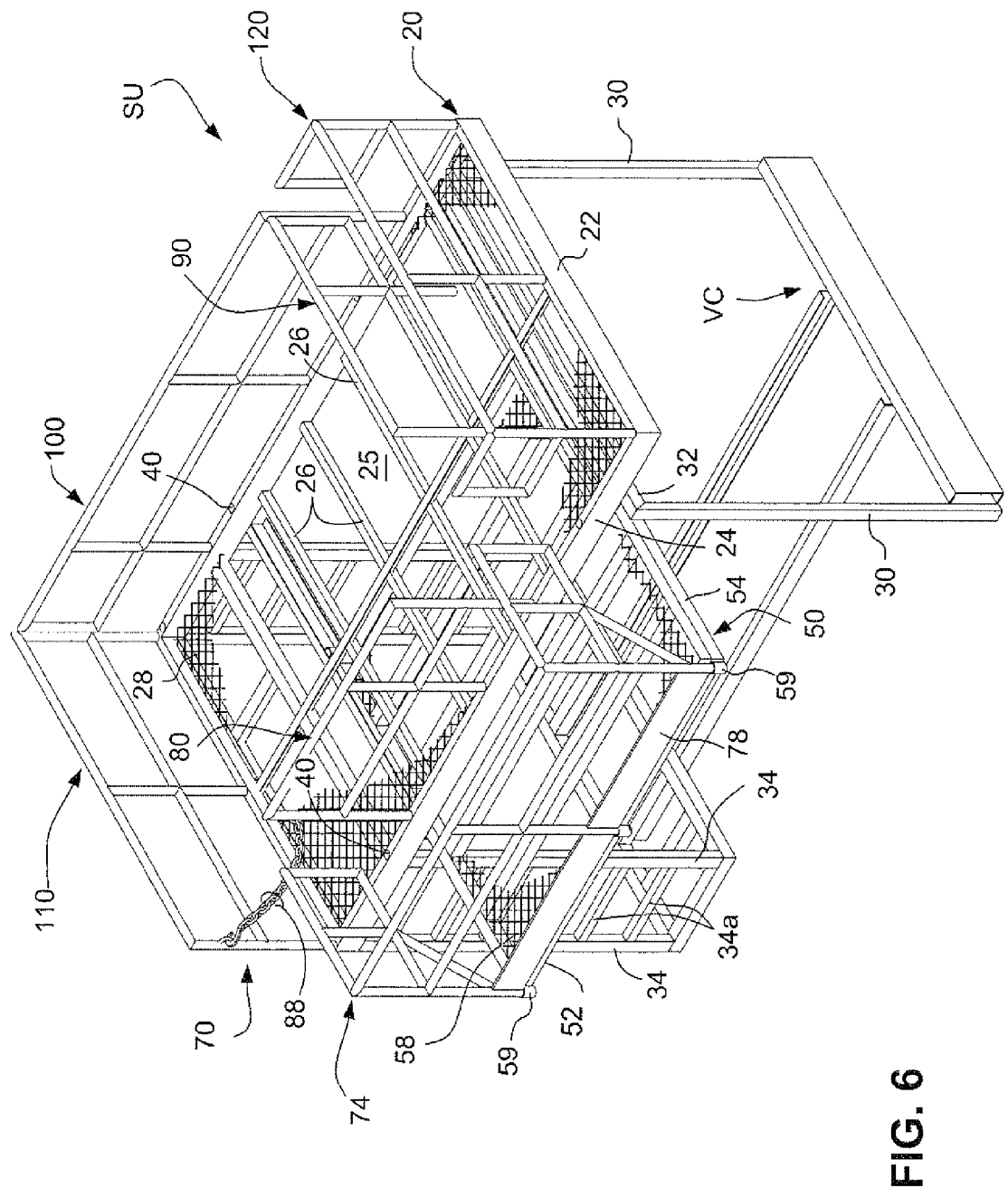
FIG. 6 is a top right perspective view from the front of the scaffolding assembly shown in FIG. 5.
Figure 7:
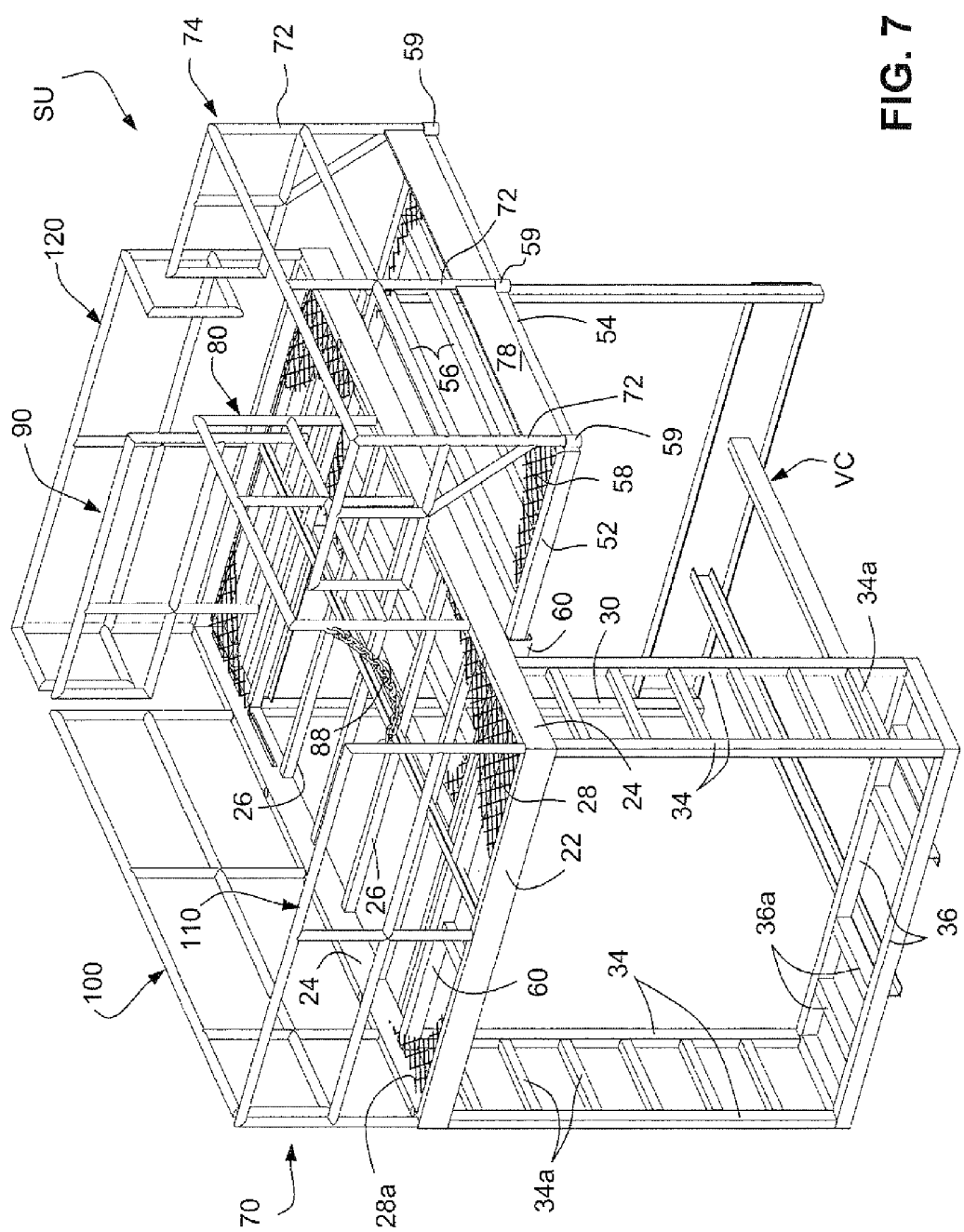
FIG. 7 is another top right perspective view from the rear of the scaffolding assembly shown in FIG. 5.
Figure 8:
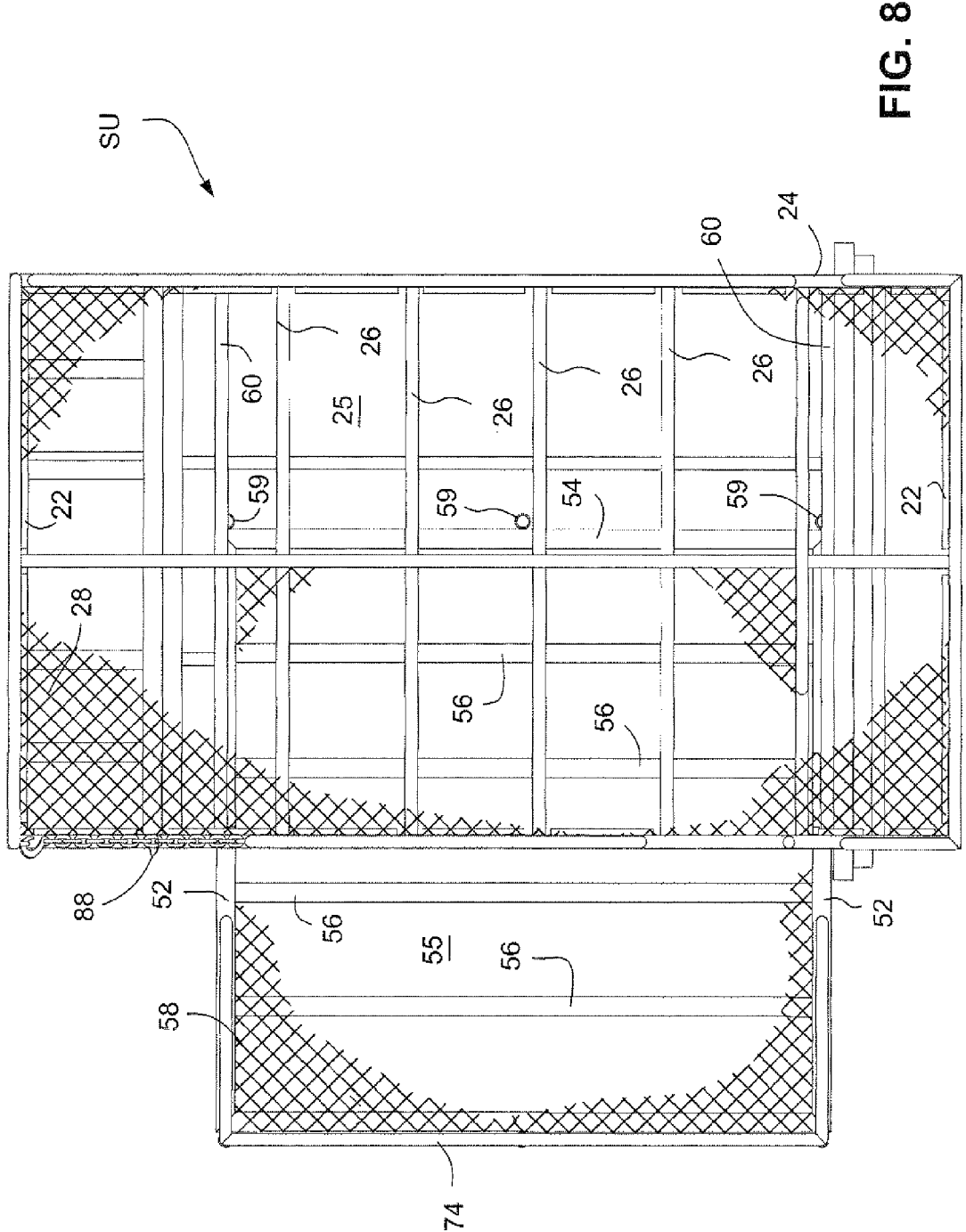
FIG. 8 is a top plan view of the scaffolding assembly shown in FIG. 5.
Figure 9:
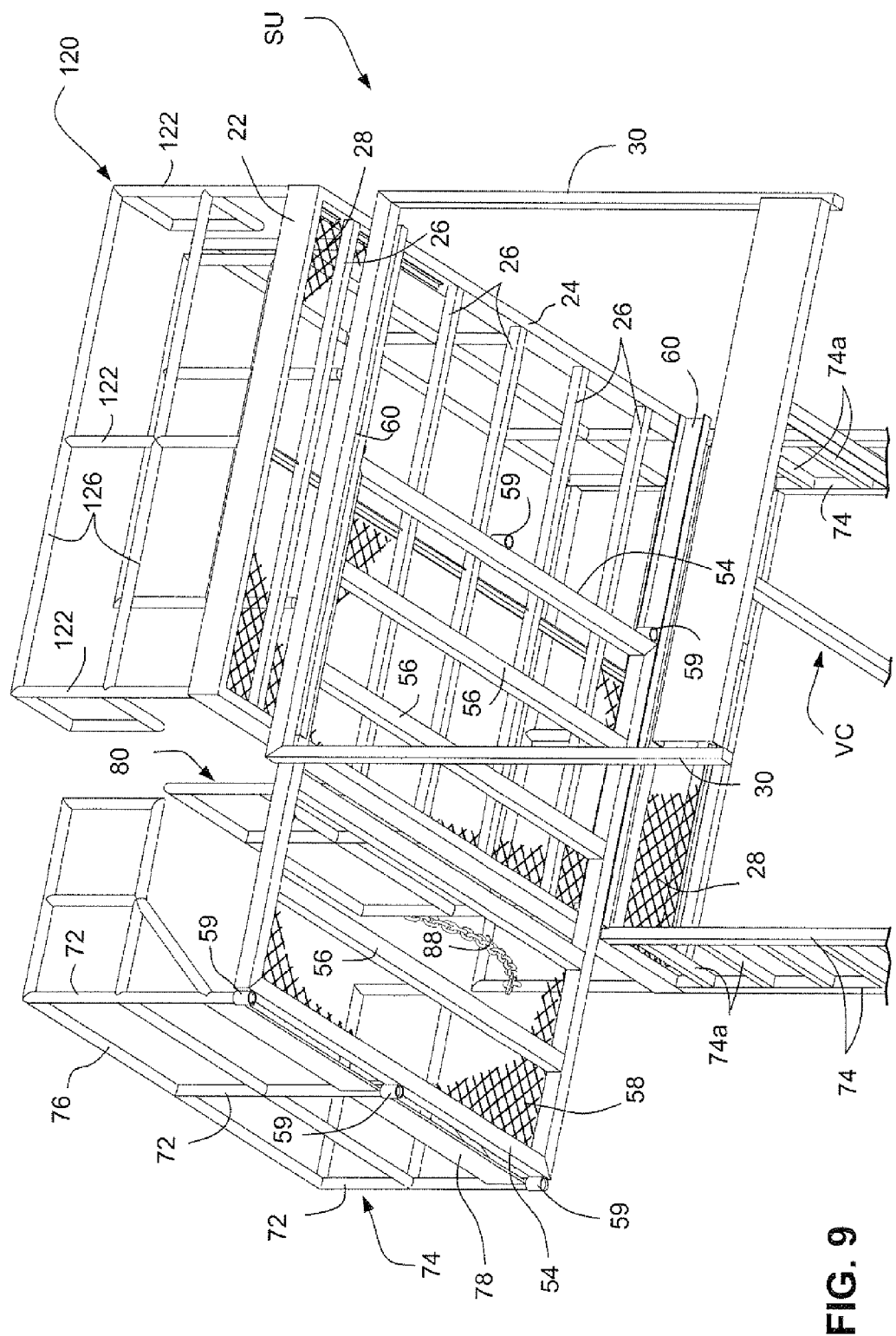
FIG. 9 is a partial bottom right perspective view from the front of the scaffolding assembly shown in FIG. 5.

In connection with the description of the present invention, the mobile scaffolding unit 10, at least in one contemplated environment for use, is intended to assist with manipulation, specifically the cutting and removal, of vegetation V adjacent to a roadway RW, particularly vegetation that is at a substantial height above the roadway RW as is schematically depicted in FIG. 1. Vegetation V is intended to encompass trees, vines, bushes, and large shrubs, among other things, as should be apparent to those skilled in the art.

As is schematically depicted in FIG. 1, an operator OP can be physically supported by the gantry platform 50 and manipulate a boom saw BS so as to trim vegetation V (e.g., tree limbs) to a desired height above and a desired distance laterally of the roadway RW so as to meet appropriate governmental standards. Once all such vegetation V has been trimmed appropriately, the mobile scaffolding unit 10 can be repositioned along the roadway RW without requiring the operator OP to dismount from the gantry platform 50. This continual rolling movement of the mobile scaffolding unit 10 provided by the motorized vehicle and the scaffolding unit SU without the requirement of operator dismount will thus translate into a significantly faster removal of vegetation V from alongside the roadway RW.

Accompanying FIGS. 5-11 depict the structures of the scaffolding unit in greater detail. In this regard, it will be observed that the stationary platform 20 is comprised of opposed pairs of perimeter frame members 22, 24 which define a generally rectangular platform area 25. Cross-support frame members 26 span the distance between the lateral frame members 24 so as to support a suitable platform deck 28 (e.g., one or more expanded metal decking sheet) over the platform area 25. The platform deck 28 is recessed somewhat below the top edges of the perimeter frame members 22, 24 so as to provide a toe-stop region 28a for an operator supported on the stationary platform 20.

The perimeter frame members are rigidly supported at a desired fixed height above the motorized vehicle MV by means of forward support columns 30 and a transverse upper support beam 32 which spans the support columns 30 for rigidly supporting a forward portion of the stationary platform 20. A respective pair of ladder supports 34 which include transverse ladder steps 34a are rigidly connected to the lateral perimeter frame members 24 so as to support a rearward portion of the stationary platform 20. The fixed ladder steps 34a of the ladder supports 34 will thus allow the operator OP to climb onto the rear portion of the stationary platform 20. The lower ends of the ladder supports 34 are spanned by a pair of cross-support beams 36 having spacer beams 36a fixed therebetween. The cross-support beams 36 are thus in turn rigidly fixed to the vehicle chassis VC to provide rearward support for the elevated stationary platform 20.

The gantry platform 50, like the stationary platform is constructed of opposed pairs of spaced-apart perimeter frame members 52, 54 joined to one another to form a generally rectangular gantry platform area 55. Cross-support frame members 56 span the distance between the lateral frame members 54 so as to support a suitable gantry platform deck 58 (e.g., one or more expanded metal decking sheet) over the platform area 55.

Figure 10:
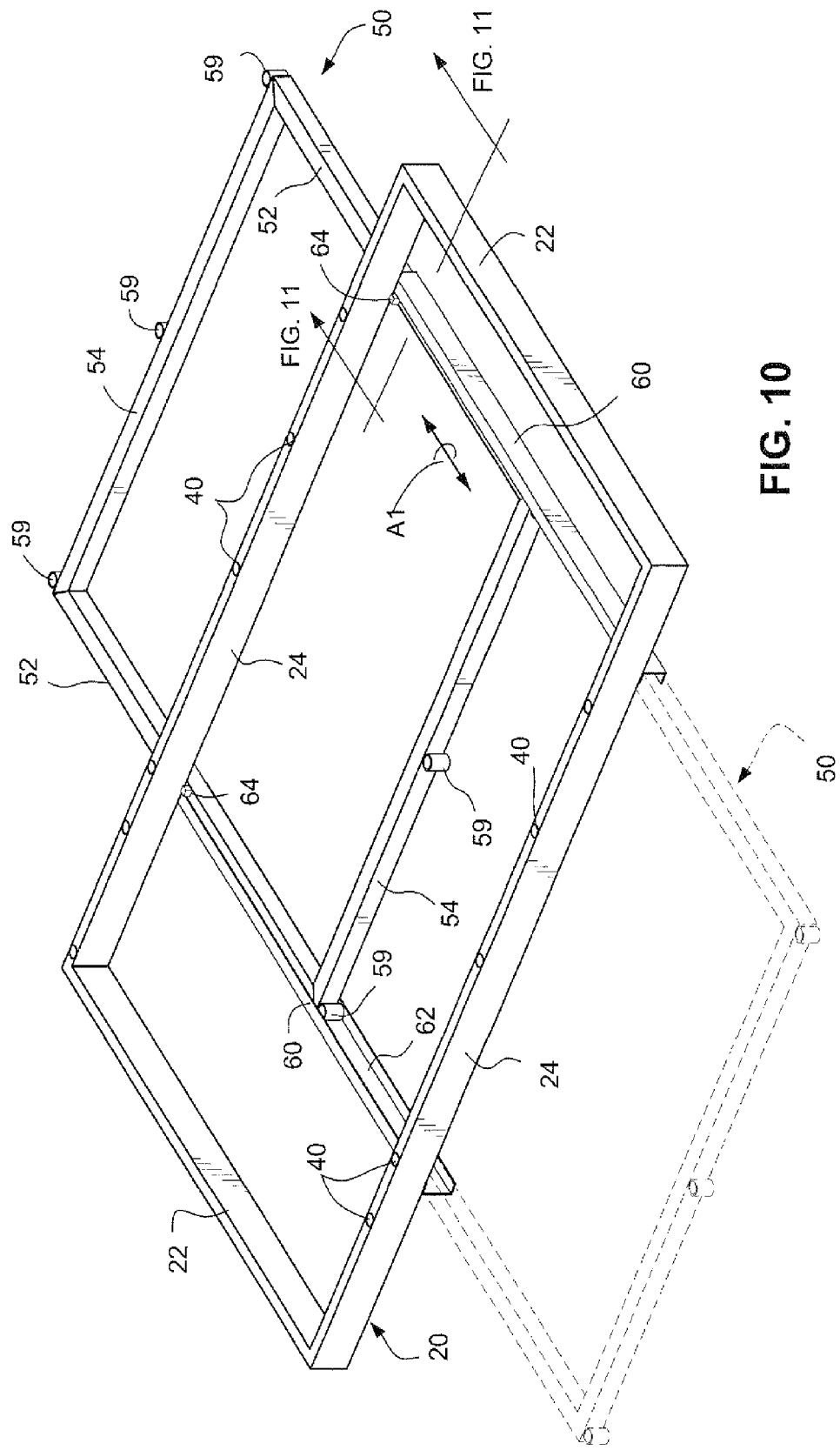
FIG. 10 is a simplified top rear perspective view of the frame members forming the stationary platform and the moveable gantry platform and their operative interconnection via the slide rail assembly.
Figure 11:
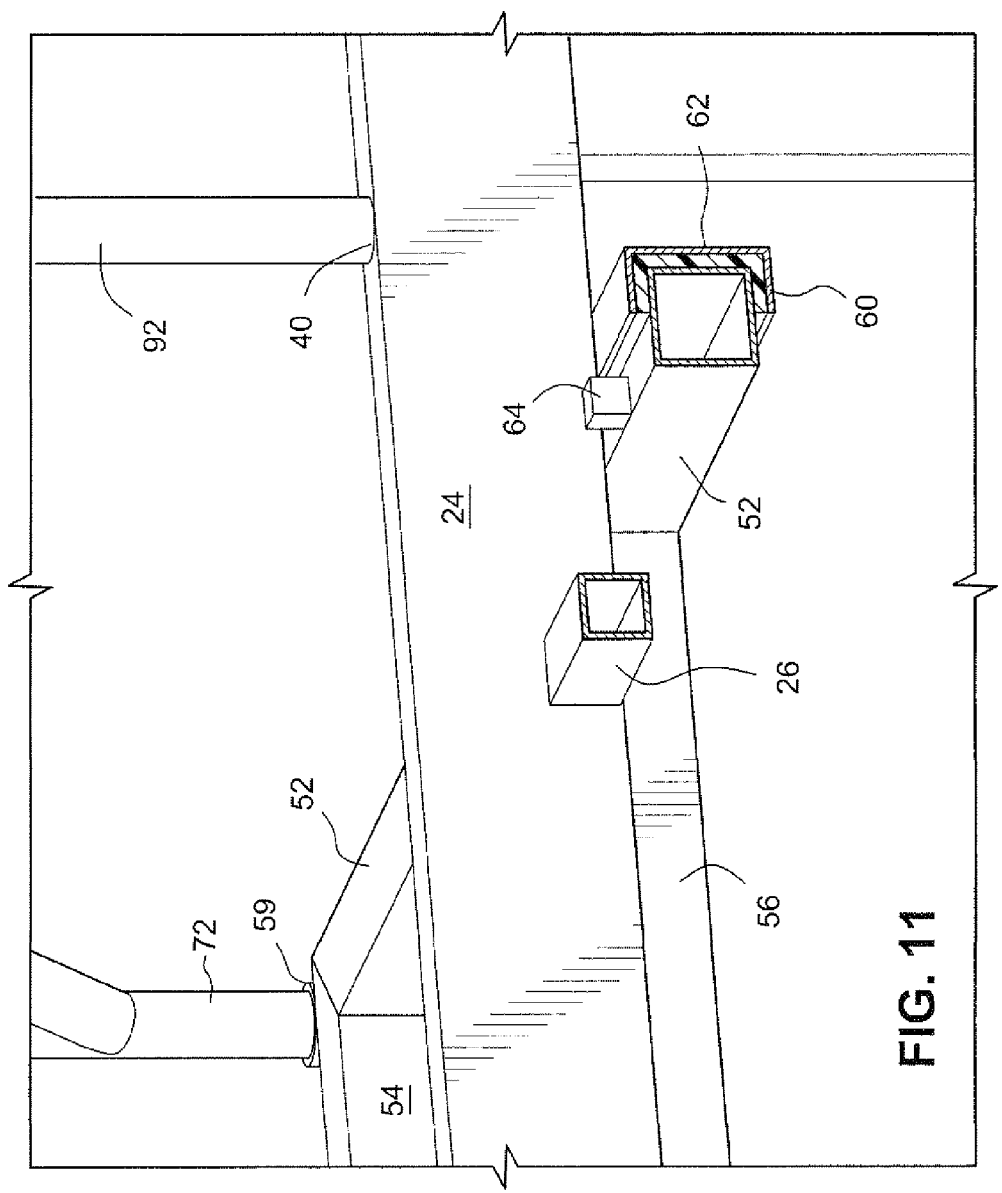
FIG. 11 is a partial cross-sectional view showing the slide and bearing rails of the slide rail assembly which interconnects the stationary platform and the moveable gantry platform as taken along lines 11-11 therein.

As is perhaps best seen from FIGS. 10 and 11 which omit some structural elements for clarity of presentation, the stationary platform 20 and the gantry platform 50 are connected to one another by means of slide rail assembly comprised of a pair of spaced-apart C-shaped slide rails 60 transversely and rigidly fixed to the frame members 24 so as to be parallel to the frame members 22. Each of the slide rails 60 in turn contains a solid C-shaped bearing 62, e.g., formed of a polymeric material such as ultra high density polyethylene. Lateral edge regions of the support frame members 52 are thus received by a respective one of the bearings 62 associated with the slide rails 60 so as to allow for reciprocal rectilinear movements (arrow A1 in FIG. 10) of the frame members 62 relative to the fixed-position slide rails 60.

The slideable and telescopic coupling of the frame members 52 and the bearings 62 of the slide rails 60 allow the entire gantry platform 50 to be moved reciprocally relative to the fixed-position stationary platform 20 between a retracted position (in which the entire gantry platform 50 is subjacently nested within the parametrical boundary of the stationary platform 20) and extended positions (wherein a portion of the gantry platform 50 is extended outwardly from one or another side of the stationary platform 20). The extended positions of the gantry platform 50 outwardly relative to each side of the stationary platform 20 are shown in solid and dashed lines in FIG. 10, respectively.

A stop post 64 (see FIG. 11) is rigidly carried by each of the frame members 52 which contacts the lateral frame members 24 so as to limit the amount by which the gantry platform 50 can be extended outwardly relative to the stationary platform 20. Preferably, the stop posts 64 are positioned approximately midway of its respective frame member 52 so as to limit the extensibility of the gantry platform 50 to approximately half the length of the frame members 52.

It will be understood that the gantry platform 50 is supported in a cantilever manner when in its extended position by virtue of a rearward portion of the frame members 52 being slidably received by the bearings 62 of the slide rails 60 and a forward portion of the frame members 52 being extended outwardly from the lateral side of the stationary platform 20. Thus, the weight of an operator OP on the gantry platform 50 when in its extended position will apply a transverse force thereto. Such a transversely applied force will in turn exert a bending moment onto the support frame members 52. Such a bending moment will thereby frictionally lock the position of the frame members 52 with respect to the bearings 62 of the slide rails 60 thereby precluding sliding movement of the gantry platform 50 when an operator OP is positioned on the platform area 55. Once the operator OP has dismounted the gantry platform 50, however, the force due to such operator weight will in turn remove the cantilever bending moment that was previously applied to the frame members 52. As such, the frame members 52 can thereafter be freely slid relative to the bearings 62 of the slide rails 60 (e.g., so as to slidably move the gantry platform 50 to its retracted position relative to the stationary platform 20 or extend the opposite end of the gantry platform 50 outwardly from the other side of the stationary platform 20).

The stationary and gantry platforms 20 and 50, respectively, are provided with a guard rail assembly 70 so as to provide a safety barrier for the operator OP when positioned thereon. In preferred embodiments, the guard rail assembly 70 is comprised of a number of removable guard rail members which in turn can be repositioned when the gantry platform 50 is moved from an extended position on one side of the stationary platform to an extended position on the other side of the stationary platform. Accompanying FIGS. 12-17 depict one possible sequence of operation whereby the extension of the gantry platform 50 can be repositioned from one side to another of the stationary platform 20.

Figure 12:
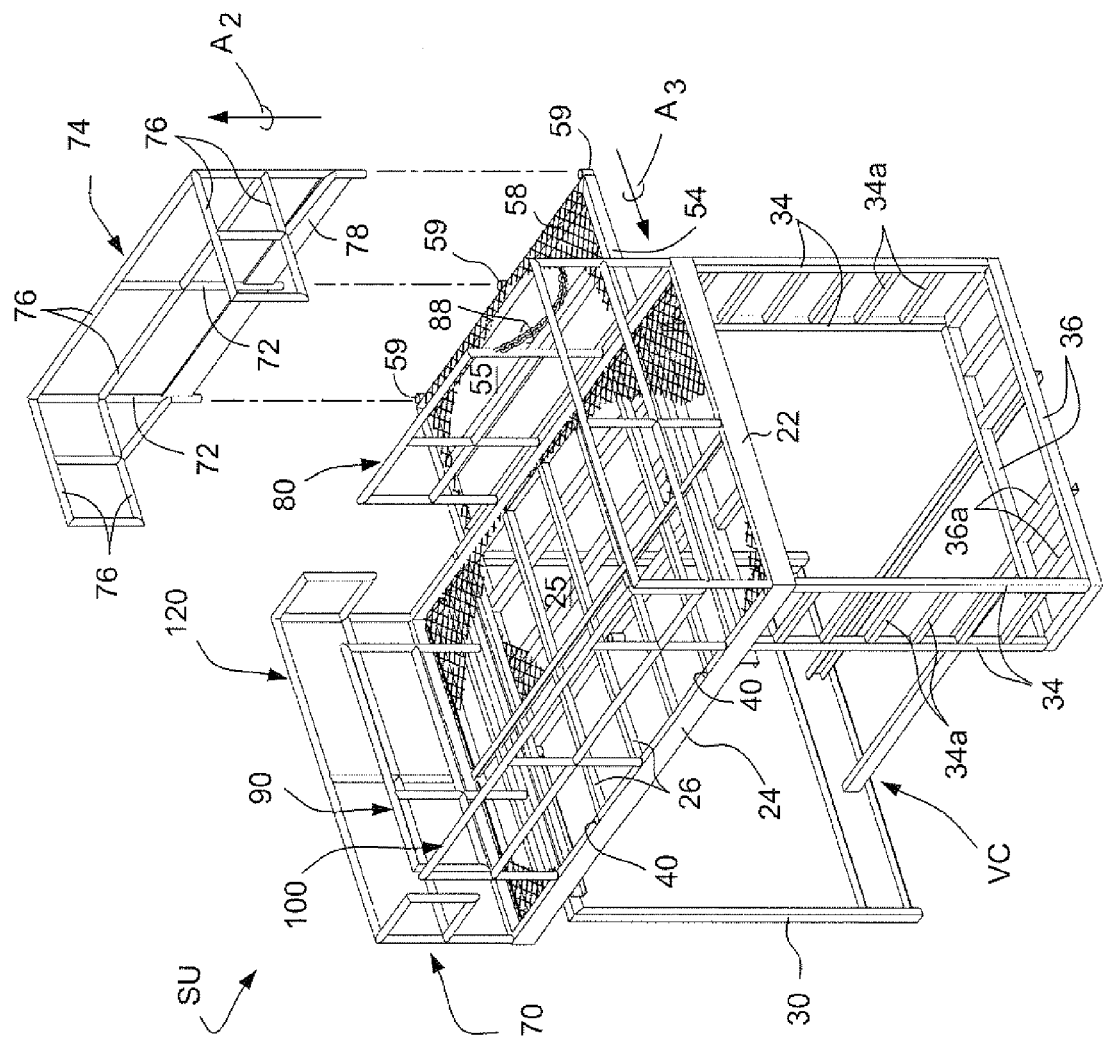
FIGS. 12-17 depict a sequence for repositioning the gantry platform and the associated safety railings from one side of the stationary platform to the other.

Specifically, as shown in FIG. 12, the gantry platform 50 includes a number of guard rail sockets 59 for removably receiving a respective lower end of a vertical post 72 associated with the gantry guard rail member 74. The horizontal rails 76 are thus fashioned in a manner that bounds the forward and lateral edges of the gantry platform 50 when in its extended position. It will be observed that a kick plate 78 is also provided at the lower region of the horizontal rails 76 to provide additional safety for the operator OP.

Figure 13:
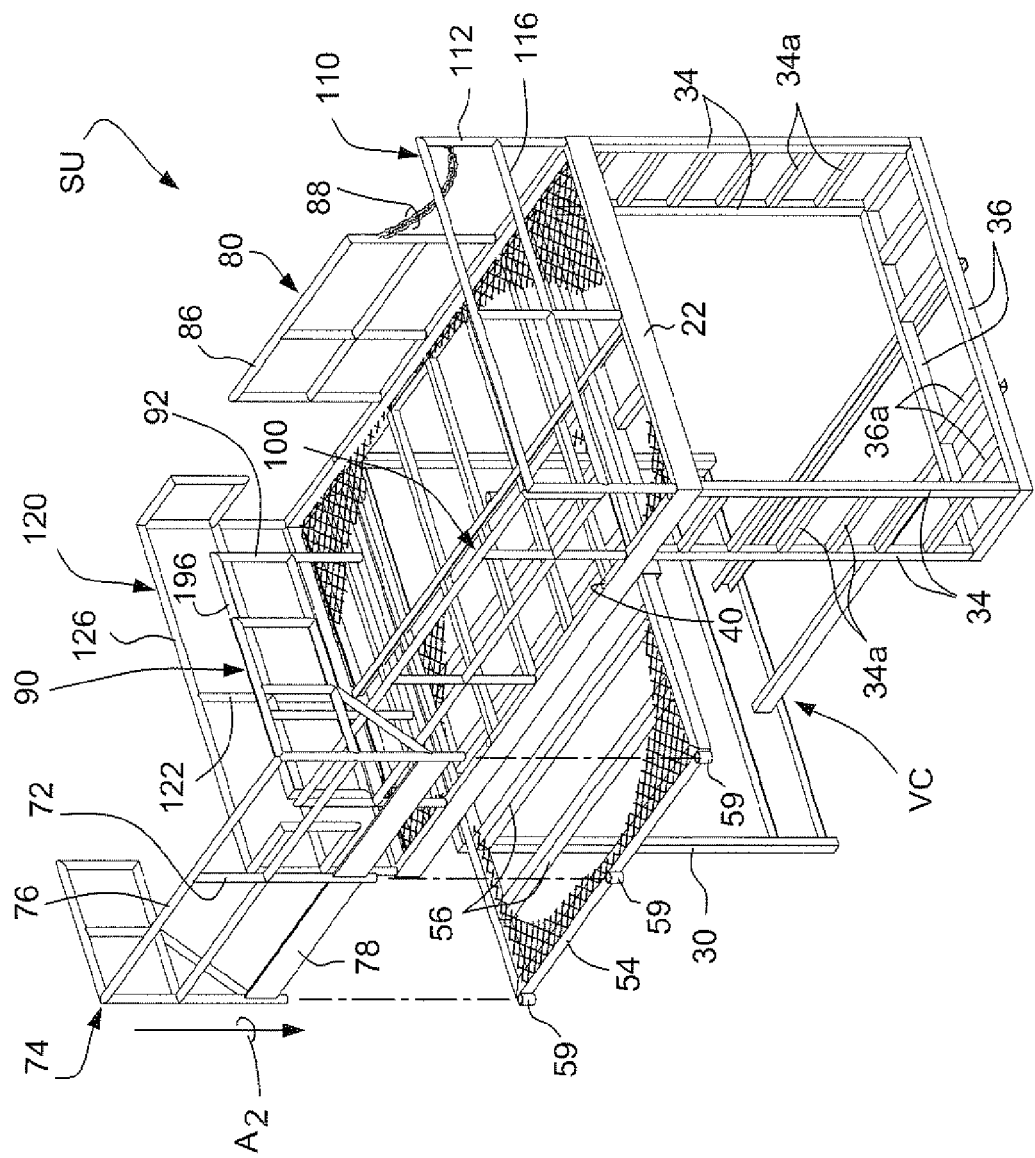
Figure 14:
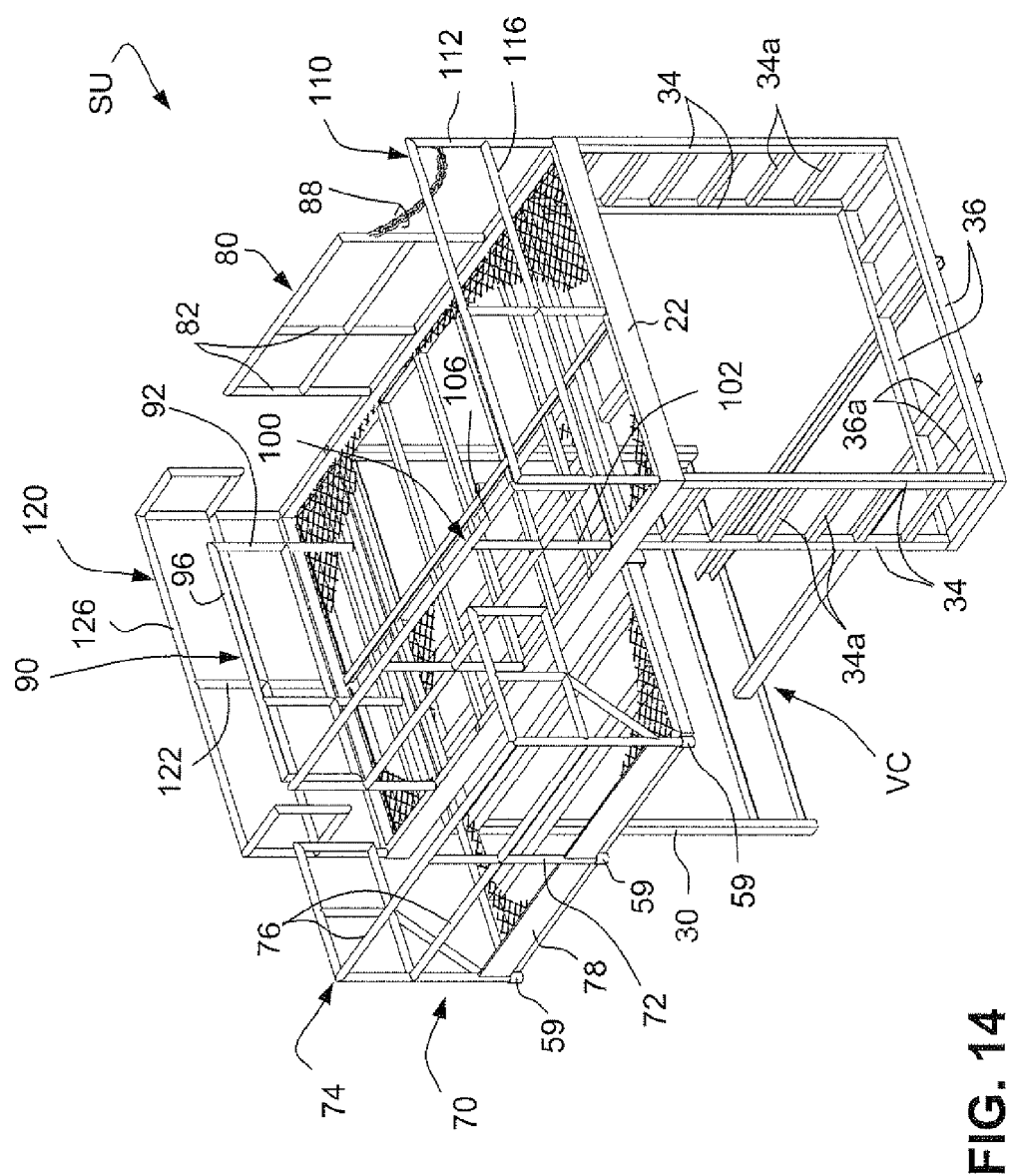

If the gantry platform 50 is only desired to be moved to its retracted position then the gantry guard rail member 74 does not need to be removed as the posts 72 would then abut against the frame member 24. However, if it is desired to move the gantry platform 50 from an extended position whereby it extends outwardly from one side of the stationary platform 20 to another extended position whereby it extends outwardly from the opposite side of the platform 20, then the posts 72 can be removed from their respective sockets 59 to allow the entire gantry guard rail member 74 to be physically separated from the gantry platform 50 (arrow A2). This will in turn allow the gantry platform 50 to be slidably moved (arrow A3) to an opposite extended position as depicted in FIG. 13. Once the gantry platform 50 has been moved to the opposite extended position, the guard rail member 74 may be reinstalled (arrow A4) into the now exposed sockets 59 positioned along the opposite one of the frame members 54 to achieve the configuration shown by FIG. 14.

Figure 15:
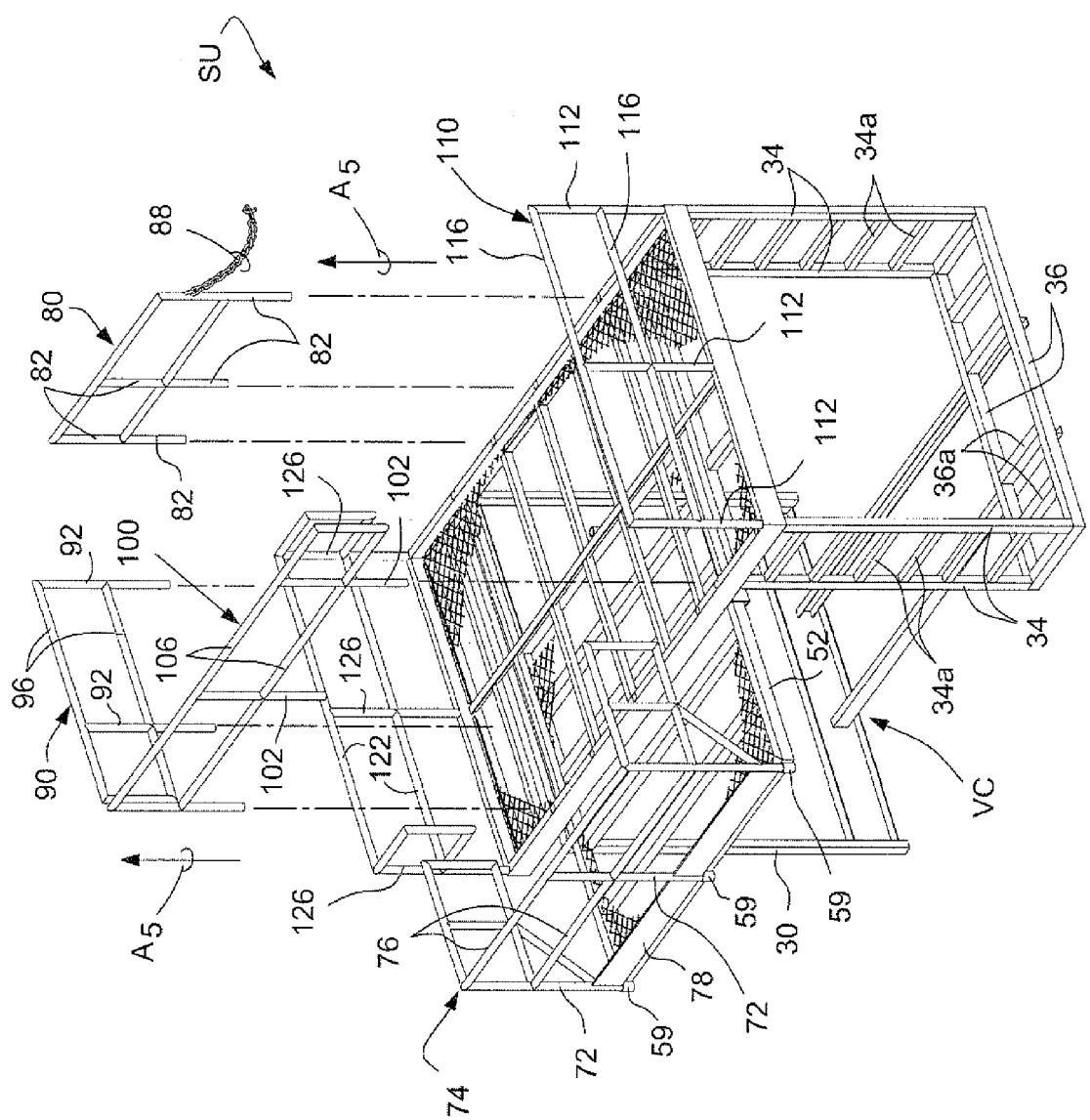
Figure 16:
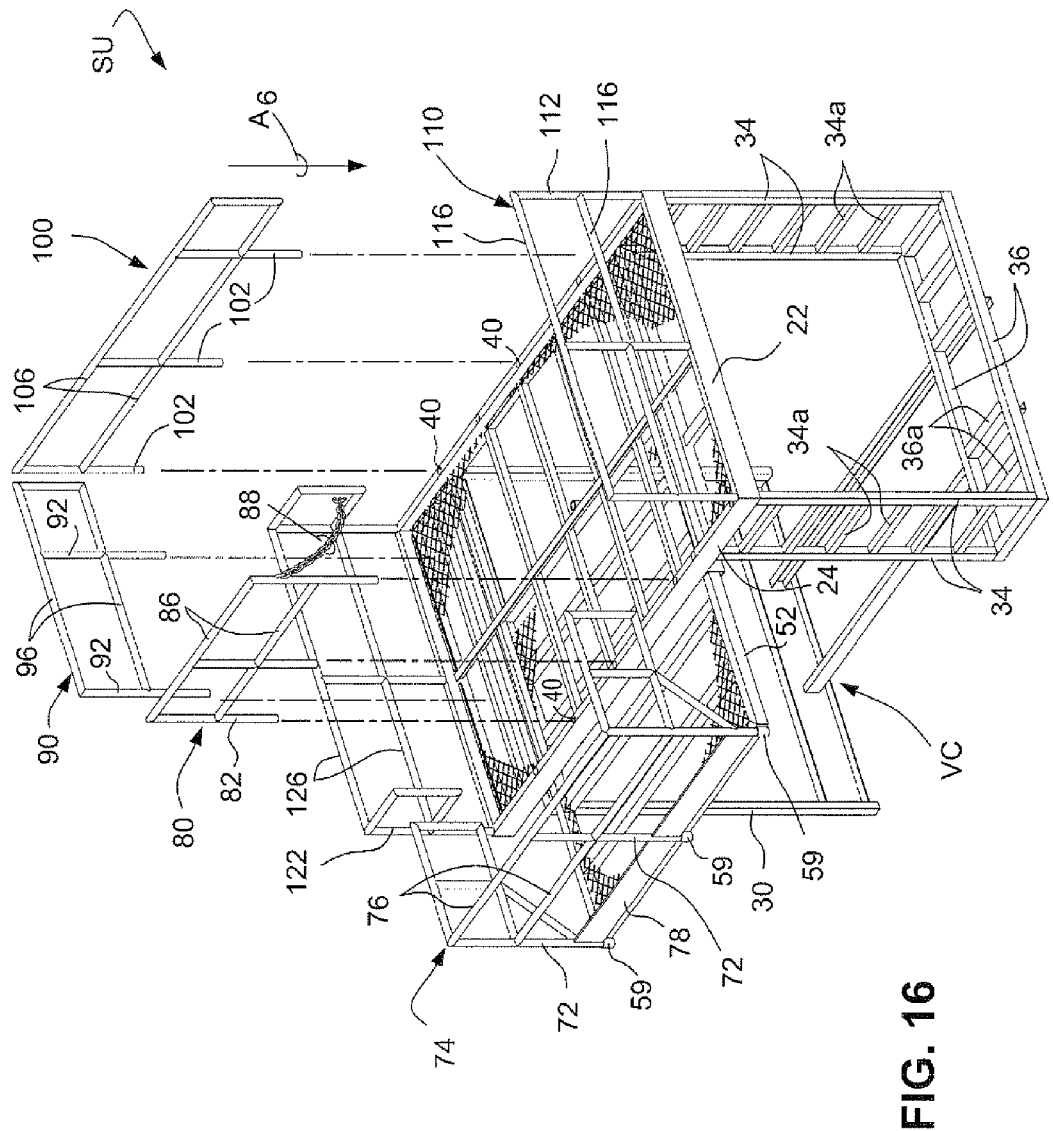
Figure 17:
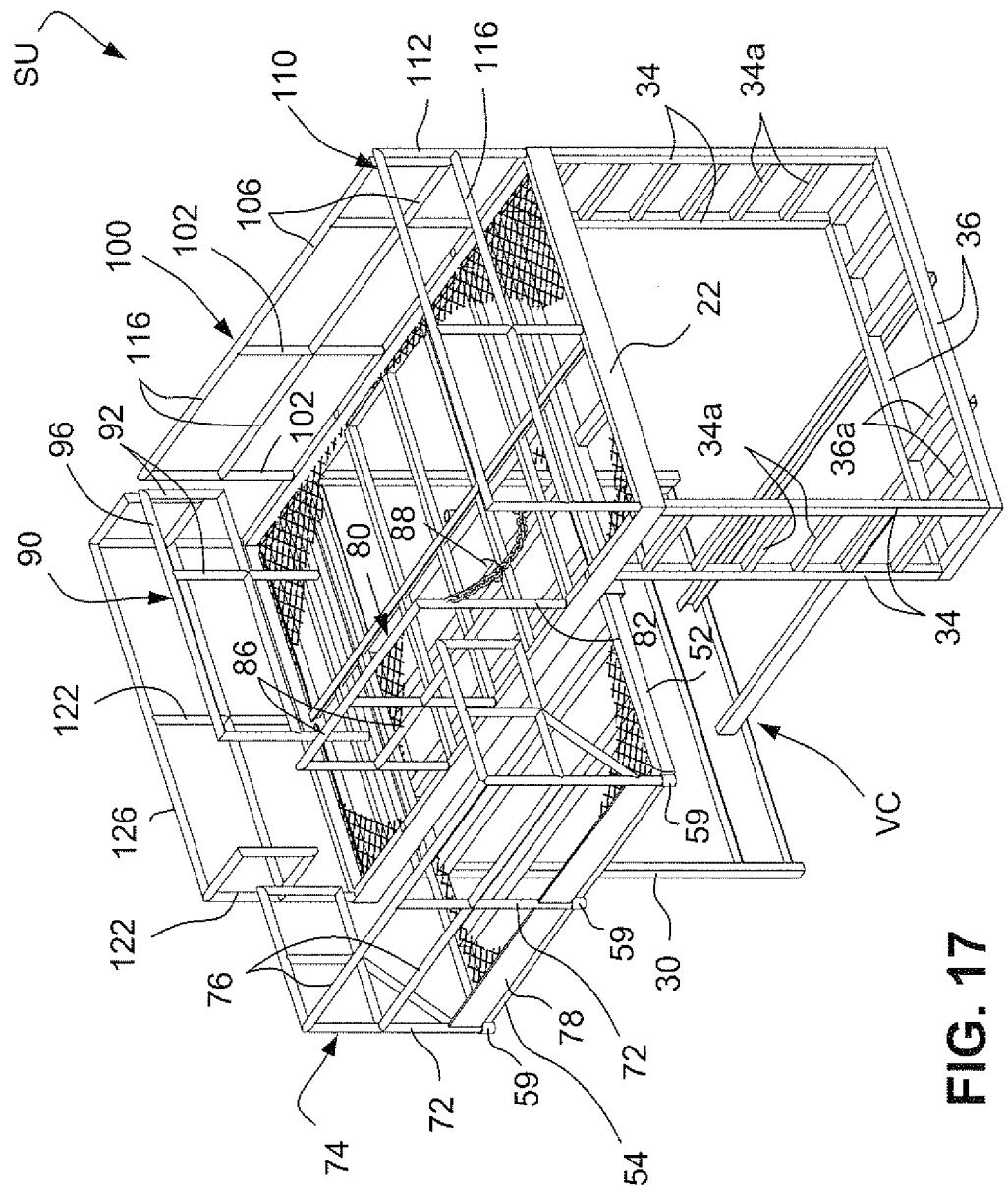

The stationary platform guardrail members 80, 82 and 84 may then be repositioned as shown by FIGS. 15-17. Specifically, each of the guardrail members 80, 90 and 100 includes respective vertical posts 82, 92, and 102 which are removably received within a socket 40 associated with the stationary platform 20. The guardrail members 80, 90 and 100 also include horizontal rails 86, 96 and 106 respectively, so each defines a substantially planar guard rail. Each of the guardrail members 80, 90 and 100 may thus be separated from the stationary platform by physically removing the posts 82, 92, and 102 (arrows A5) from a respective one of the sockets 40.

While physically removed, the guardrail members 80, 90 and 100 may be reversed so as to be positioned in mirror image arrangement as shown by FIG. 16. The posts 82, 92, and 102 may then be received by a respective one of the sockets 40 (arrows A6) so as to assume the position as shown in FIG. 17. Following the repositioning of the guardrail assembly 70 as discussed above, the operator OP may again mount the platforms 20, 50, e.g., by climbing the steps 34a of a respective one of the ladder support 34 depending on the extended position of the gantry platform 50 relative to the stationary platform 20.

As will be observed, a flexible safety guard 88 formed of a suitable chain, cable, rope or the like spans the distance between the guardrail member 80 and the fixed-position rear guard rail member 110 (comprised of vertical posts 112 and horizontal rails 116) so as to close the access space therebetween. A fixed position U-shaped forward guardrail member 120 (comprised of vertical posts 122 and horizontal rails 126) may also be provided at a forward end of the stationary platform 20.

While the present invention is described in connection with the trimming of trees and like vegetation V adjacent to a roadway RW, the present invention may be employed for many other types of operations. For example, it is contemplated that the motorized vehicle MV of the present invention may be employed in circumstances where the walls of a tunnel need to be cleaned. Alternatively, the vehicle MV of the present invention may be employed where a vertical surface needs to be painted or otherwise refurbished. In still a further embodiment, the vehicle MV might be employed by those responsible for changing light bulbs in roadside lamps or even fixtures on buildings. For example, it is contemplated that the vehicle VM of the present invention might be employed to assist with changing light bulbs in the canopies that extend over the gas pumps at a gas station. The sheer magnitude of the possible applications of the present invention discourages the presentation of an exhaustive list of potential uses. It is to be understood, however, that the present invention is not limited solely to the cutting and trimming of roadside vegetation V. To the contrary, as should be apparent to those skilled in the art, any number of possible uses may be found for the present invention.

It is also noted that the present invention has been discussed in connection with the cutting and trimming of vegetation V adjacent to a roadway RW. However, as should be immediately apparent, the present invention may be employed off-road as well. Specifically, the scope of the present invention is intended to encompass both on-road and off-road environments.

In addition, the specific reference to any single aspect of the present invention is not intended to be limiting of the invention. Certain aspects of the invention may have been discussed in connection with "the present invention" merely to simplify the discussion. In other words, reference to "the present invention" in one or more contexts above is not intended to be limiting thereof.

The particular motorized vehicle MV to which the scaffolding unit SU is attached is not critical. Thus, a wide variety of electric and internal combustion engine vehicles can be contemplated to provide the mobile scaffolding unit 10 with self-propelled functionality, i.e., so the scaffolding unit SU can be moved periodically over ground surface. Thus, any variety of wheeled or tracked vehicles is currently contemplated for use in the present invention.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A scaffolding unit comprising:
   a stationary platform; and
   a gantry platform operatively connected to the stationary platform for movements between a first extended position where the gantry platform extends outwardly from one side of the stationary platform and a second extended position where the gantry platform extends outwardly from an opposite side of the stationary platform, and
   a guard rail assembly which bounds a perimeter of the stationary and gantry platforms when the gantry platform is in one of the first and second extended positions thereof, wherein
   the guard rail assembly comprises a gantry guard rail which is removably attached to the gantry platform, the gantry guard rail being removed when the gantry platform is in the first extended position thereof so as to allow the gantry platform to thereafter be moved from the first extended position to the second extended position thereof, the gantry guard rail being reattached to the gantry platform when in the second position as a mirror image of the gantry guard rail attached to the gantry platform when the gantry platform is in the first extended position thereof.

2. The scaffolding unit as in claim 1, further comprising a slide rail assembly to operatively connect the gantry platform for reciprocal rectilinear sliding movements between a retracted position wherein the slide rail assembly is nested with the stationary platform and each of the first and second extended positions, wherein the slide rail assembly comprises a stop member which defines each of the first and second extended positions.

3. The scaffolding unit as in claim 1, further comprising a slide rail assembly to operatively connect the gantry platform for reciprocal rectilinear sliding movements between a retracted position wherein the slide rail assembly is nested with the stationary platform and each of the first and second extended positions.

4. The scaffolding unit as in claim 3, wherein the slide rail assembly comprises a pair of slide rail members rigidly connected to the stationary platform, and a pair of support frame members associated with the gantry platform which are slideably received by the slide rail members.

5. The scaffolding unit as in claim 4, wherein each of the slide rail members comprises a bearing member.

6. The scaffolding unit as in claim 5, wherein the bearing member comprises a solid polymeric bearing material.

7. The scaffolding unit as in claim 1, wherein a rearward portion of the gantry platform provides cantilever support for a forward portion thereof when in the first and second extended positions, respectively.

8. The scaffolding unit as in claim 7, wherein weight applied to the forward portion of the gantry platform when in the first and second extended positions applies a bending movement to the rearward portion of the gantry platform thereby frictionally locking the position of the gantry platform against movement toward the retracted position thereof.

9. A mobile scaffolding unit comprising a vehicle, and a scaffolding unit according to claim 1 which is fixed to and carried by the vehicle.

10. A mobile scaffolding unit comprising:
    a vehicle for movement across ground surface;
    a stationary platform rigidly fixed to the vehicle at a predetermined immovable height above the ground surface;
    a gantry platform operatively connected to the stationary platform for movements between a retracted position where the gantry platform is nested adjacent to the stationary platform, and first and second extended positions wherein the gantry platform extends laterally outwardly from one and another lateral side of the stationary platform, respectively, to provide an operator on the gantry platform an extended horizontal reach laterally of the vehicle; and
    a guard rail assembly which bounds a perimeter of the stationary and gantry platforms when the gantry platform is in one of the first and second extended positions thereof, wherein
    the guard rail assembly comprises a gantry guard rail which is removably attached to the gantry platform, the gantry guard rail being removed when the gantry platform is in the first extended position thereof so as to allow the gantry platform to thereafter be moved from the first extended position to the second extended position thereof, the gantry guard rail being reattached to the gantry platform when in the second position as a mirror image of the gantry guard rail attached to the gantry platform when the gantry platform is in the first extended position thereof.

11. The mobile scaffolding unit as in claim 10, wherein the gantry platform is operatively connected to the stationary platform so as to be cantilever supported thereby when the gantry platform is in the first and second extended positions thereof, wherein weight applied to the forward portion of the gantry platform when in the first and second extended positions applies a bending movement to the rearward portion of the gantry platform thereby frictionally locking the position of the gantry platform against movement toward the retracted position thereof.

12. The mobile scaffolding unit as in claim 11, further comprising a slide rail assembly to operatively connect the gantry platform for reciprocal rectilinear sliding movements between the retracted and extended positions relative to the stationary platform.

13. The mobile scaffolding unit as in claim 12, wherein the slide rail assembly comprises a pair of slide rail members rigidly connected to the stationary platform, and a pair of support frame members associated with the gantry platform which are slidably received by the slide rail members.

14. The mobile scaffolding unit as in claim 13, wherein each of the slide rail members comprises a bearing member.

15. The mobile scaffolding unit as in claim 14, wherein the bearing member comprises a solid polymeric bearing material.

16. The mobile scaffolding unit as in claim 15, wherein the slide rail assembly comprises a stop member which defines the first and second extended positions of the gantry platform.

* * * * *